Jan. 8, 1946.  G. E. PRICE  2,392,692
HEATING APPARATUS
Filed Feb. 17, 1942  2 Sheets-Sheet 1

WITNESSES:
F. E. Browder
Andrew J. Cook

INVENTOR
GEORGE E. PRICE
BY
ATTORNEY

Jan. 8, 1946. G. E. PRICE 2,392,692
HEATING APPARATUS
Filed Feb. 17, 1942 2 Sheets-Sheet 2

WITNESSES:
F. E. Browder
Andrew J. Cook

INVENTOR
GEORGE E. PRICE
BY
ATTORNEY

Patented Jan. 8, 1946

2,392,692

UNITED STATES PATENT OFFICE 2,392,692

HEATING APPARATUS

George E. Price, Mansfield, Ohio, assignor to Westinghouse Electric Corporation, East Pittsburgh, Pa., a corporation of Pennsylvania Application February 17, 1942, Serial No. 431,212

1 Claim. (Cl. 219—37)

This invention relates to electrical ranges of the general type having a platform or table-type top and surface heating units mounted in openings in the platform or top thereof, and an object is to provide an improved low-cost simple and reliable range of this type.

Another object is to provide a range embodying an improved combination of drip pan and removable or plug-in type surface heating unit.

A further object is to provide an improved range having a platform or table-type top with a drip pan integral with the platform or top thereof and a surface heating element removably supported over the drip pan.

A still further object is to provide an improved range having a drip pan integral with the platform or top thereof, and a side terminal removable or plug-in type heating element having terminals which project through an opening in the side of the drip pan whereby the edges of the opening in the drip pan guide the terminals as the heating element is placed in its normal operating position.

A still further object is to provide an improved range having a drip pan integral with the platform or top thereof and a surface heating unit removably supported over the drip pan and connected to a suitable source of power in such manner that when the heating element is removed for cleaning of the same and the drip pan, the power supply terminals are isolated from accidental contact by the user, thereby protecting the user from danger of accidental electrical shock.

These and other objects are effected by the invention as will be apparent from the following description and claim taken in connection with the accompanying drawings, forming a part of this application, in which:

Figure 1:
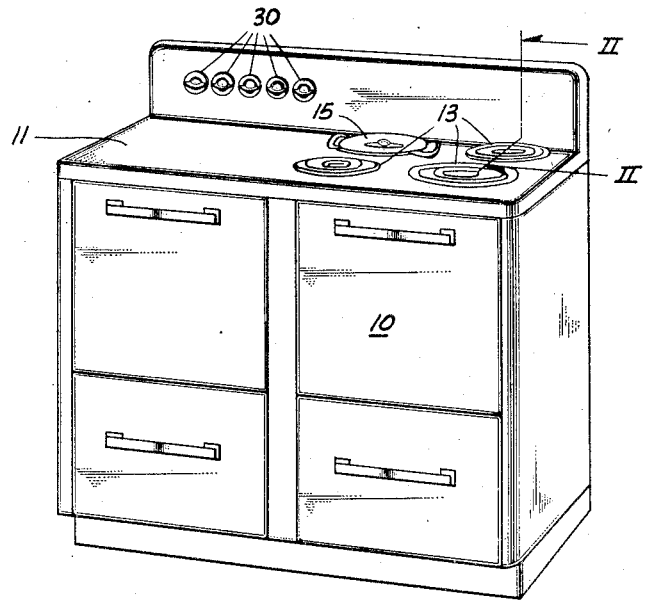
Fig. 1 is a perspective view of a range embodying this invention.

Referring to the drawings for a detail description of the invention, in Fig. 1, there is shown a range 10 of any desirable design having a substantially horizontal platform of table-type top 11 preferably formed from sheet metal, which is coated with an acid-resistant or ground coat of vitreous enamel after the sheet metal is shaped to provide the range, although, it may be formed from some other suitable material.

The platform or top 11 is provided with a plurality of openings 12 in which surface heating elements 13, on which cooking utensils, such as pots, pans, and the like, may be heated, are positioned. An opening in which a deep-well cooker 15 is positioned is also provided in the platform. A dished combination drip pan and reflector 16 is positioned below each of the openings 12 and directly below each of the respective heating elements 13. To simplify illustration of the invention, only one heating element and only one pan will be described in detail, it being understood that the other heating elements and pans are formed and arranged in the same manner.

Figure 6:
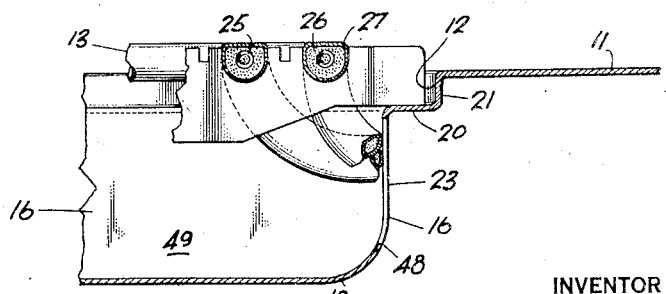
Fig. 6 is a fragmentary sectional view of a modification.

The pan 16 is defined by a substantially horizontal imperforate bottom wall 18, a substantially vertical cylindrical side wall 19, a substantially horizontal shoulder 20 adjacent the top of the side wall 19, and a substantially vertical cylindrical portion 21 extending upwardly from a shoulder 20. The pan may also include a substantially horizontal flange 22 which extends from the top of the cylindrical portion 21. In the embodiment shown in Fig. 2, the pan 16 is attached to the platform or top of the range by welding the flange 22 to the underside of the platform 11 peripherally of the opening 12. However, it is understood that the pan may be formed integral with the platform 11 by drawing the material within the boundary defined by the opening 12, as illustrated in Fig. 6. The side wall 14 of the pan is also preferably imperforate, except for an opening 23 through which the terminals of the heating element 13 extend when the heating element is in its normal-use position.

Figure 4:
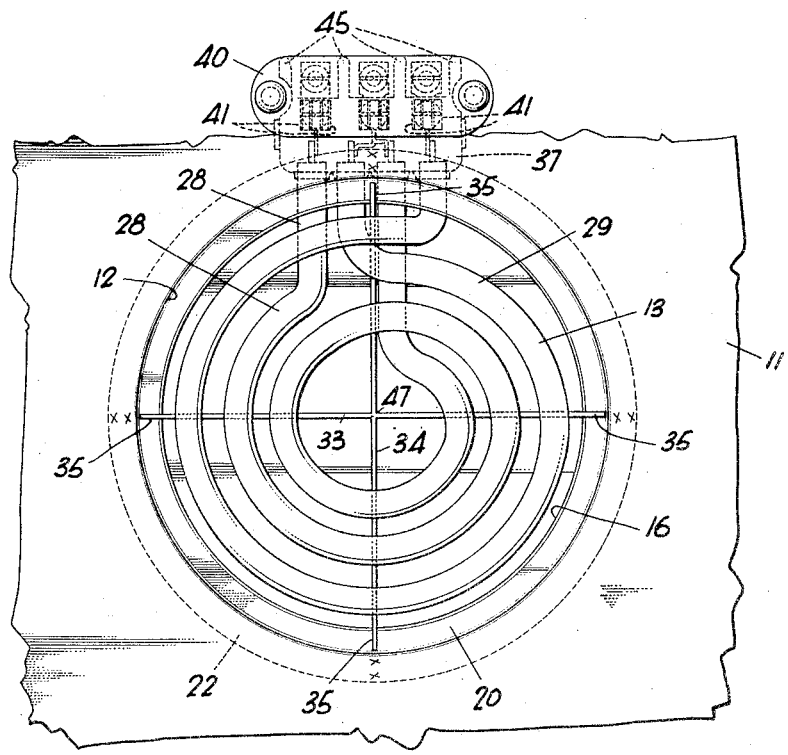
Fig. 4 is a fragmentary top plan view of the range shown in Fig. 1, with parts broken away to simplify illustration.

The heating element 13 consists of a grid of sheathed wire. This sheathed wire consists of a spiral of resistance wire 25 embedded in insulation material 26 and surrounded by a tubular metal sheath 27. As shown in Fig. 4, the grid is formed of two separate coils or spirals 28 and 29 for the purpose of obtaining different degrees of heat, as is well understood in the art. The coils are properly connected for obtaining the different degrees of heat by switches (not shown) which are controlled by knobs 30 (Fig. 1). The grid is mounted in substantially right angular supporting arms 33 and 34, ends 35 of which rest on the shoulder 20 on the pan 16 and support the grid in the opening 12. It will be noted that the surface of the grid is somewhat above the flat platform or top 11 of the range so that when an article, as for instance, a cooking utensil, is placed upon the range it will rest directly upon the grid.

The ends of the coils or spirals 28 and 29 are brought to one side of the grid and fastened to a terminal shield 32 by brazing, welding, or swaging to make a water-tight joint. A substantially rectangular non-conducting terminal block 37 is positioned within the terminal shield 32. The terminal block 37 fits snugly around knife blade-type terminals 38 which are connected to the ends of the resistance wires 25. It will be noted that the terminals 38 project a substantial distance beyond the peripheral edge of the grid. This facilitates placing of the heating element into its normal-use position in the opening 12 and also permits the cooperating terminals, which are described hereinafter, to be located a substantial distance from the opening 23 in the side wall 16 of the pan. This reduces the possibility of accidentally contacting them and consequently receiving an electrical shock from the same when the heating element 13 is removed from the opening 12.

A terminal block 40 of non-conducting material is attached in any suitable manner to the under side of the platform or top 11 and in line with the opening 23 in the pan. This terminal block carries pairs of bent spring clip terminals or contacts 41 between which the knife blade terminals 39 engage and contact therewith when the heating element 13 is in its normal-use position. The spring clip contacts 41 are connected to a suitable source of power by conductor strips 42, screws 43, and conductors 44. Insulating shields 45 depend from the base portion of the terminal block 40 down between the adjacent sets of clip contacts 41. The bends in the lower edges of the adjacent pairs of clip contacts provide a flaring entrance to the space between adjacent pairs of the contacts, which facilitates insertion of the knife blade terminals 30 therebetween.

Figure 2:
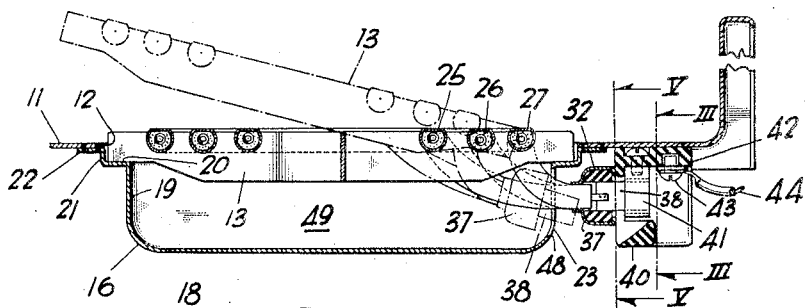
Fig. 2 is a section taken approximately along line II—II of Fig. 1.
Figure 3:
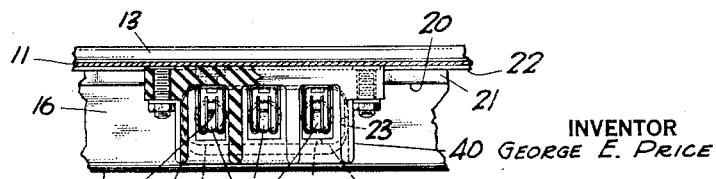
Fig. 3 is a section taken approximately along line III—III of Fig. 2.

To place the heating element 13 in its normal-use position, it is tilted upward at the left, as indicated in dotted outline in Fig. 2, and the terminals 30 and the terminal block 37 are projected through the opening 23 in the side wall of the pan. The heating element is then lowered to the position shown in full lines in Fig. 2. In the meantime, it is also moved to the right to cause the knife blade terminals 38 to engage the respective clip contacts 41 and thereby connect the heating element 13 to the power supply.

Figure 5:
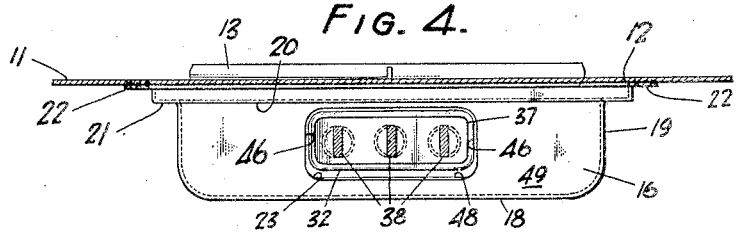
Fig. 5 is a section taken along line V—V of Fig. 2.

The aperture 23 in the side wall of the pan is just a little wider than the terminal block 37, as shown in Fig. 5, and as the heating element 13 is placed in its normal-use position, the marginal portions 46 (Fig. 5) of the side wall of the pan adjacent the ends of the aperture 23 serve to guide the terminal block 37 and consequently the knife-blade terminals 38 so that the knife-blade terminals properly engage the respective spring clip contacts 41, when the heating element is lowered to its normal-use position in the opening 12.

The heating element 13 may be removed from the opening 12 to clean the same or to clean the drip pan 16, as by gripping the supporting arms 33 and 34 of the grid near their centers or, in other words, near where they cross each other at 47, and lifting up on the grid so as to raise the left-hand side, as seen in Fig. 2, from the opening 12. This movement swings the knife-blade terminals 38 downward from between the clip contacts 41 and breaks the electrical connection to the heating element 13. Then the heating element is moved to the left to draw the terminal block and consequently the knife-blade terminals through the opening 23 in the side wall of the pan.

After the heating element 13 has been removed from the opening in the manner just described, it may be taken over a sink or the like and all foreign matter scraped or washed from the same. The pan 16 may also be wiped clean with a wet rag or any other suitable implement.

The bottom 48 of the opening 23 in the side wall 19 of the pan is preferably a substantial distance above the bottom wall 18 of the pan. This provides a considerable collection space 49 in the bottom of the pan for catching grease, crumbs, or any other matter that might drop from vessels heated on the heating element.

The inside of the pan 16 is made shiny by polishing the same or applying a shiny coating of acid-resistant or ground coat enamel thereon so as to provide a reflector which reflects heat radiated downwardly from the bottom of the heating element 13 upwardly again to the vessel being heated. The pan may be enameled at the same time that the platform is enameled. This permits the manufacturing cost to be held to a minimum, and, if the pan is formed separately and attached to the platform, the enameling material collects in any cracks between the pan and the platform and gives the apperance that the pan is formed integral with the platform.

In some instances, when the heating element 13 is removed for cleaning of the same and the pan, the clip contacts 41 might be energized, such as might happen if through negligence or accident the knobs 30 controlling the switches are turned to "on" position. An advantage of this construction is that, if this should happen, it is almost impossible for one cleaning the pan to accidentally contact the energized contacts 41 because they are located outside of the pan 16 and are a sufficient distance from the opening 23 so that it is very improbable that one cleaning the pan will contact them unless an intentional effort is made to do so.

Heretofore, electric ranges have been provided with movable heating elements and removable reflector and drip pans located below the heating elements in such manner that the pans may be removed from the range for cleaning of the same. In these constructions, the pan and the heating element both are generally movable, and to remove the pan one must raise the heating element with one hand and remove the pan with the other hand. An advantage of the present construction is that there is only one movable part, the heating element, and it may be removed with one hand to permit cleaning of the same and the pan.

In the prior art constructions, the pan generally has openings in the bottom thereof for the heating element terminals to pass through. It has been found that grease and the like also passes through these holes and drips down into the range structure below the pan. When this grease becomes hot or rancid, it gives off offensive odors. Accordingly, another advantage of the present construction is that the pan has no holes in the bottom thereof through which grease may drip down into the range structure below the pan.

Still another advantage of the present construction is that a much stronger platform or top can be provided, without the use of braces or other reinforcing means, by making the pan integral with the platform or top or by permanently attaching it thereto, than is possible with the prior art construction wherein the pans are removable from the platform or top.

From the foregoing description and the drawing, it is seen that this invention provides an improved low-cost simple and reliable electrical range having a substantially horizontal platform or top, and a reflector and drip pan formed integral with the platform or top, wherein all of the advantages mentioned hereinbefore are present.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claim.

What I claim is:

In an electric range, the combination of a sheet metal platform having an opening therein, a sheet metal drip and reflector pan structure having a side wall, said pan structure being welded to said platform peripherally of said opening and depending from the platform in line with said opening, a vitreous enamel covering on said platform and said pan structure, said coating being applied to said platform and said pan structure as a unit after they have been attached together, said pan structure having an aperture in the side wall thereof, a heating element adapted to be supported over said pan structure for cooking on the platform and readily removable therefrom for cleaning of the same and the pan, said heating element including a terminal structure, said terminal structure being adapted to pass through said aperture in the side wall of the pan structure when said heating element is placed in its normal-use position over the pan structure for surface cooking on the platform and when it is removed for cleaning of the same and the pan, and contact means disposed exterior of said pan structure beneath said platform and engageable by said terminal structure for electrically connecting said heating element to a suitable source of power to heat said heating element to cooking temperature.

GEORGE E. PRICE.